(12) United States Patent
Kuki

(10) Patent No.: US 6,523,592 B2
(45) Date of Patent: Feb. 25, 2003

(54) LAMINATING DEVICE WITH LAMINATE EDGE CUTTING UNIT

(75) Inventor: Masakazu Kuki, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 43 days.

(21) Appl. No.: 09/746,766

(22) Filed: Dec. 26, 2000

(65) Prior Publication Data

US 2001/0004915 A1 Jun. 28, 2001

(30) Foreign Application Priority Data

Dec. 24, 1999 (JP) ............................................. 11-367796

(51) Int. Cl.$^7$ ............................................... B32B 31/18
(52) U.S. Cl. ........................ 156/353; 156/378; 156/360; 156/364; 156/363
(58) Field of Search ................................ 156/378, 360, 156/361, 362, 363, 364, 351, 353, 522, 552, 267; 83/425.3, 425.4

(56) References Cited

U.S. PATENT DOCUMENTS 4,505,772 A * 3/1985 Renz ........................... 156/355
5,562,008 A * 10/1996 Lordo ........................... 83/39
5,580,417 A    12/1996 Bradshaw

FOREIGN PATENT DOCUMENTS

JP        10-507005        7/1998

OTHER PUBLICATIONS

U.S. patent application Ser. No. 09/354,086, Onoda et al., filed Jul. 15, 1999.

* cited by examiner

Primary Examiner—Richard Crispino
Assistant Examiner—Geroge R. Koch III
(74) Attorney, Agent, or Firm—Oliff & Berridge, PLC

(57) ABSTRACT

A reference-side longitudinal cutting unit and an other side longitudinal cutting unit are disposed to move separately to the left and right sides of a laminate to be cut. A cutter 62a of the reference-side longitudinal cutting unit and a rotary knob 80 for turning on, for example, a power switch 82 are connected to a link mechanism 84 for linking pivotal movement of the rotary knob 80. According to the mode selection position of the rotary knob 80, the cutters 62a, 62b are moved into a retracted position when the rotary knob 80 is in the power OFF or no-mode selection positions and move to a longitudinal cutting position when the rotary knob 80 is in the margin or NO-MARGIN mode selection position.

6 Claims, 11 Drawing Sheets

LAMINATING DEVICE WITH LAMINATE EDGE CUTTING UNIT

BACKGROUND OF THE INVENTION

1. Field of the Invention

The present invention relates to laminating device for adhering a synthetic resin web to both upper and lower surfaces of a sheet-shaped object.

2. Description of the Related Art

There has been a laminating device for laminating a synthetic resin web, for example, onto a card or other sheet-shaped object.

Japanese Patent-Application Publication No. HEI-10-507005 discloses a laminating apparatus with a transfer apparatus, a web cartridge detachably fitted in the transfer apparatus, and a feed tray detachably mounted in the web cartridge.

The web cartridge includes upper and lower feed rolls. Each feed roll contains a wound up web of web, such as pet web. One feed tool is disposed above the feed tray and the other fed tool is disposed below the feed tray.

The transfer apparatus includes upper and lower nip rollers disposed at the sheet-discharge side of the web cartridge, and an external crank handle for rotating the nip rollers in synchronization when turned. The transfer apparatus also includes a cutting blade that extends transversely adjacent a discharge opening of the transfer apparatus.

A sheet on the feed tray is transported in a sheet feed direction, between the feed rolls, to the upper and lower nip rollers. The nip rollers further transport the sheet therebetween, while drawing the web from the upper and lower feed rolls to laminate the sheet with the webs. The cutting blade is then operated by the user pressing a handle, to cut the webs in an X direction, which is perpendicular to the sheet feed direction, thus producing a laminate.

SUMMARY OF THE INVENTION

Sometimes the laminating webs can be excessively wide with respect to the sheet to be laminated, that is, their length is excessive in the X direction. Also, the sheet can be too wide compared to the webs, so that the sheet sticks out from between the webs after lamination is complete. In such cases, it would be desirable to cut off these unneeded edge portions off from the laminate. However, conventional devices are not provided with configuration for cutting left, right, or both edges of the laminate, that extend parallel with the transport direction, that is, with the Y directions. These edges will be referred to alternately as margins hereinafter.

An application for U.S. patent was filed in co-assigned U.S. application Ser. No. 09/354,086 for a laminating apparatus with a longitudinal cutting mechanism that can cut the produced laminate to a large or small width. The longitudinal cutting mechanism includes two blades and a penetration estrangement mechanism disposed near the port from which the laminate is discharged. The penetration estrangement mechanism pivots the two blades vertically between a position separated from the laminate and a position in contact with the laminate. When a sensor detects that the size of the laminating web is excessively larger than the sheet to be laminated, then the penetration estrangement mechanism pivots the two blades vertically downward into the position where they will cut into the laminate from above. The blades slice off side edges of the excessively large web from the longitudinal sides of the laminate as the laminate is transported.

However, because the blades are disposed directly above the transport pathway of the laminate, when the laminate webs are first transported after replacement or exchange of the web cassette, the blades can contact one or both of the laminate webs even when the blades are pivoted into the position separated from the transport pathway. When the blades contact a laminate web, they can interfere with its transport or even damage the laminate web. The laminate webs need not be installed using a cassette for this potential problem to occur, but could be in an uncovered condition when replenished or exchanged.

It is an objective of the present invention to overcome the above-described problem and provide a laminating apparatus that moves at least a reference edge cutter to a position to the widthwise outside of the transport path of the laminate when a power source is turned off, so that the webs can be easily replaced without being damaged.

In order to achieve the above-described objectives, a laminating apparatus according to the present invention includes a power switch, a sheet transport unit, a laminating unit, a cutter unit, and a cutter transport unit.

The power switch turns on and off a power source that supplies power. The sheet transport unit transports, in a transport direction, a sheet to be laminated. The laminating unit feeds out laminating webs having a predetermined width in a widthwise direction, which is perpendicular to the transport direction. The laminating unit adheringly laminates the laminating webs onto upper and lower surfaces of the sheet transported by the sheet transport unit, thereby producing a laminate having the predetermined width;

The cutter unit cuts a widthwise edge from the laminate following the transport direction. The cutter unit is disposed downstream from the laminating unit in the transport direction. The cutter transport unit selectively positions the cutter unit at a cut position for cutting the laminate, and, when the power switch turns off the power source, moves the cutter unit in the widthwise direction to a retracted position outside the predetermined width of the laminate.

With this configuration, when the power switch of the laminate device is turned OFF, then the cutter unit is automatically moved to a position to the outside of the width of the laminate. While the cutter unit is in this position, the cutter unit is not positioned in the pathway that the webs are transported through. Therefore, when the webs are exchanged while the cutter unit is in this position, the webs can be set in the laminating apparatus safely and reliably.

It is desirable that the cutter unit include a reference side cutter and an other side cutter disposed at a reference side and an other side, respectively, in the widthwise direction for cutting away widthwise opposite edges of the laminate, that the power switch include a rotary knob rotatable between different mode positions for selecting different modes including a power off mode to turn off the power source, and that the cutter transport unit include a linking mechanism for linkingly transmitting rotation movement of the rotary knob to the reference side cutter to move the reference side cutter between the cut position and the retracted position in accordance with the mode position of the rotary knob.

With this configuration, when the user rotates the rotary knob to turn the power switch ON and OFF, the reference side cutter is automatically moved via the linking mechanism to the cut position or the retracted position and maintained in that position. As a result, the webs will only be changed while the reference side cutter is in the retracted position, so that web exchange can be safely and reliably performed.

It is desirable that the cutter transport unit further include a drive motor that selectively moves the other side cutter between the retracted position and the cut position in accordance with the mode position of the rotary knob.

With this configuration, the other side cutter is controlled to move and position in conjunction with the movement and positioning of the reference side cutter. Therefore, operations for setting the webs and for cutting the laminate can be easily achieved.

It is desirable that when the rotary knob is in a power off position for selecting the power off mode, the cutter transport unit moves the reference side cutter and the other side cutter into the retracted position.

With this configuration, when the rotary knob is in a power off position, the cutter transport unit moves the reference side cutter and the other side cutter into the retracted position. Therefore, the webs can be set safely and reliably.

BRIEF DESCRIPTION OF THE DRAWINGS

The above and other objects, features and advantages of the invention will become more apparent from reading the following description of the embodiment taken in connection with the accompanying drawings in which:

FIG. 9 (b) is a schematic view showing relationship between a POWER OFF mode position of the rotary knob and positions of components in the link mechanism;

FIG 9 (c) is a schematic view showing relationship between a MARGIN mode position of the rotary knob and positions of components in the link mechanism;

FIG. 9 (d) is a schematic view showing relationship between a NO MARGIN mode position of the rotary knob and positions of components in the link mechanism;

DETAILED DESCRIPTION OF THE EMBODIMENT

Next, an explanation of a laminating apparatus according to an embodiment of the present invention will be described while referring to the attached drawings.

Figure 1:
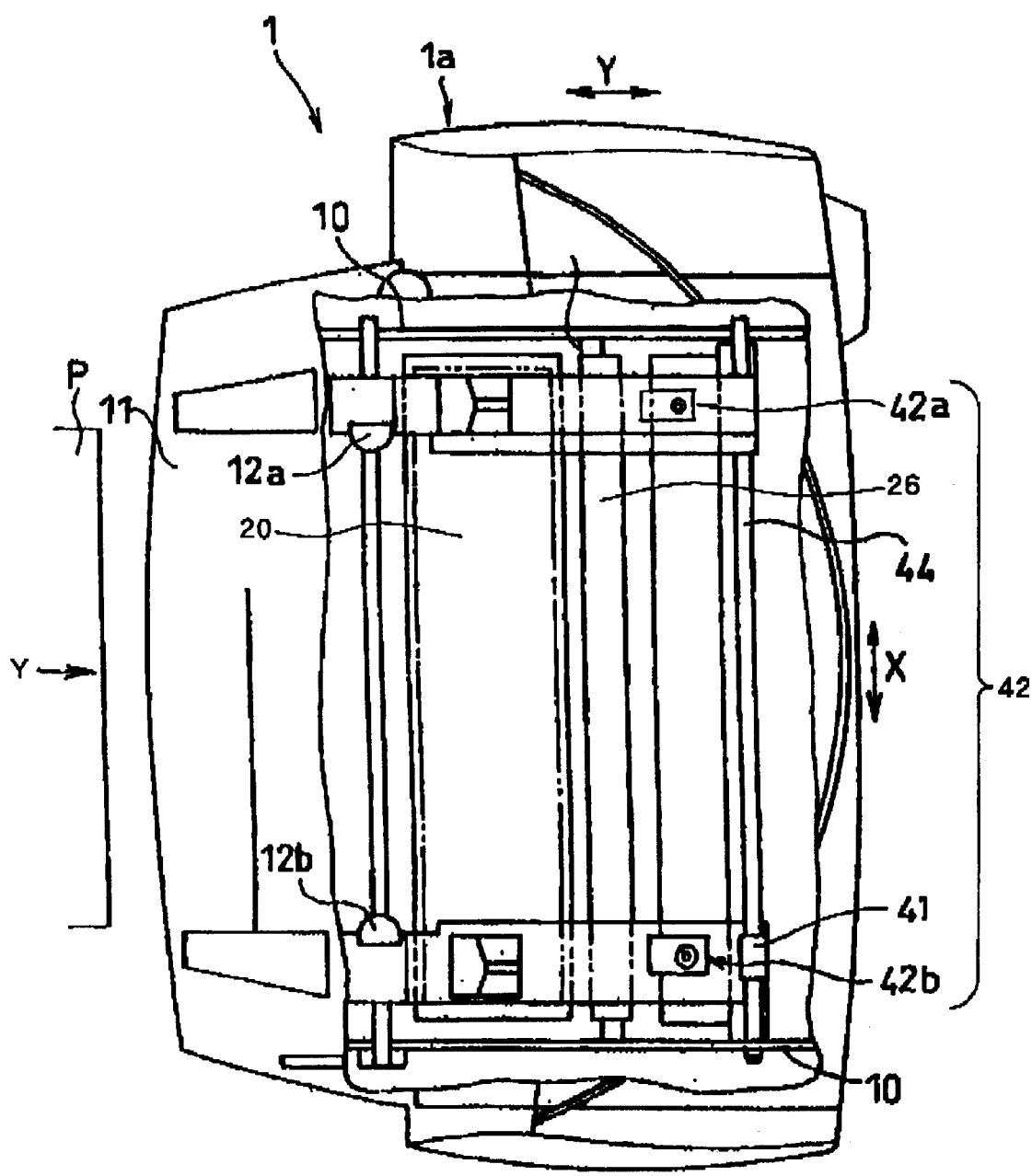
FIG. 1 is a plan view showing a laminating apparatus according to an embodiment of the present invention, with a portion of an external case cut out to enable viewing internal components.
Figure 2:
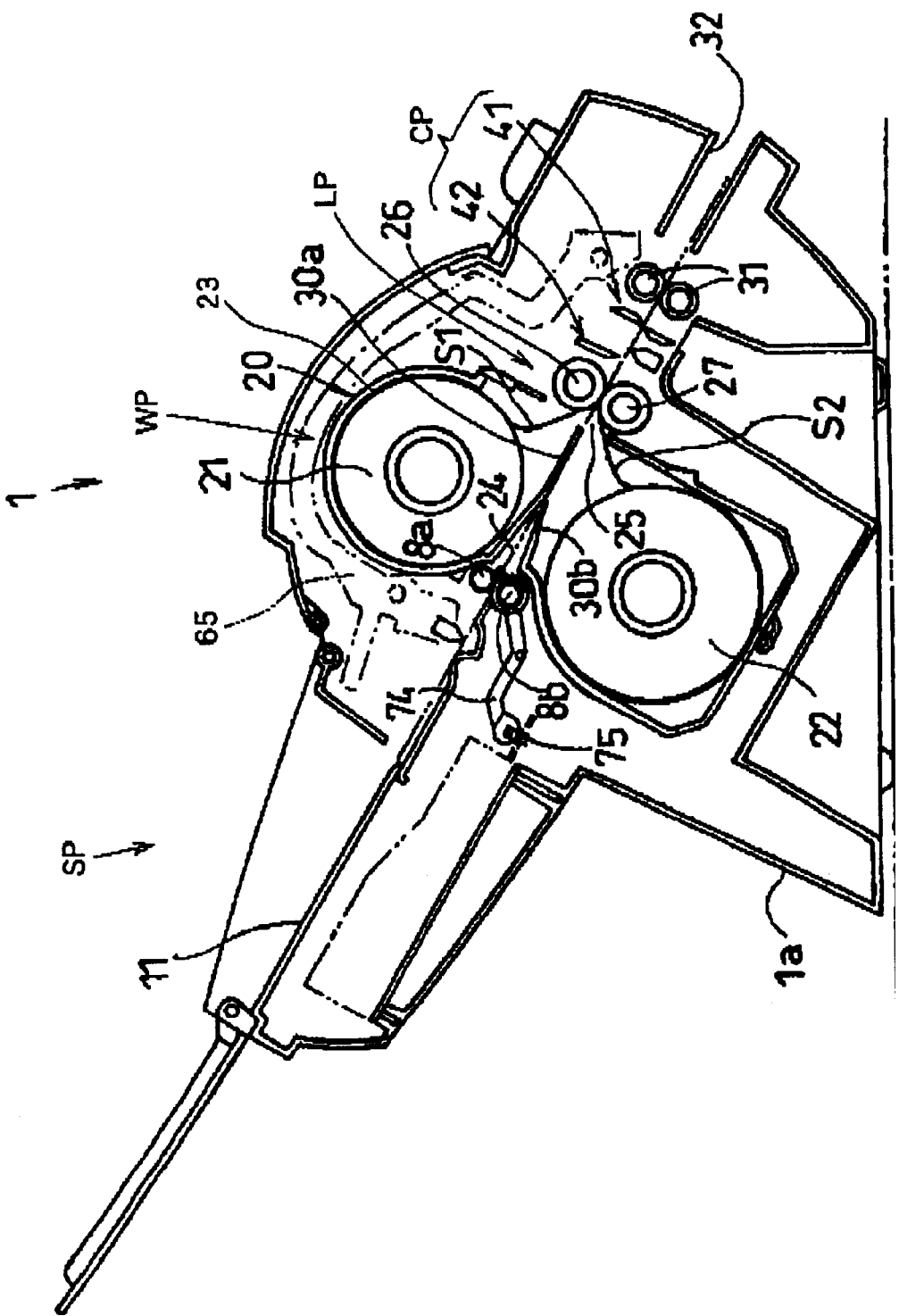
FIG 2 is a cross-sectional side view showing the laminating apparatus of FIG. 1.

As shown in FIG. 1, a laminating apparatus 1 according to the present embodiment includes a case 1a formed from synthetic resin. As shown in FIG. 2, the laminating apparatus 1 includes a sheet supply portion SP for supplying an sheets P, such as a document or a card represented by sheet P hereinafter, a web supply portion WP for supplying laminating webs S1, S2 for laminating the sheet P, a laminating portion LP that operates to sandwich the sheet P supplied from the sheet supply portion between the webs S1, S2, and a cutting portion CP that cuts the laminate discharged from the laminating portion LP.

As shown in FIGS. 1 and 2, the sheet supply portion SP includes a sheet supply tray 11 and a pair of sheet supply rollers 8a, 8b. The sheet supply tray 11 is disposed at the upper left hand portion of the case 1a as viewed in FIG. 2. The sheet supply tray 11 includes a flat surface, on which sheets P are stacked as target objects to be laminated, and sheets guides 12a, 12b for positioning the sheets P in the widthwise direction. At least one of the sheet guides 12a, 12b are supported movable in the x-wise directions to enable freely adjusting distance between itself and a wall surface of the case 1a.

Figure 3:
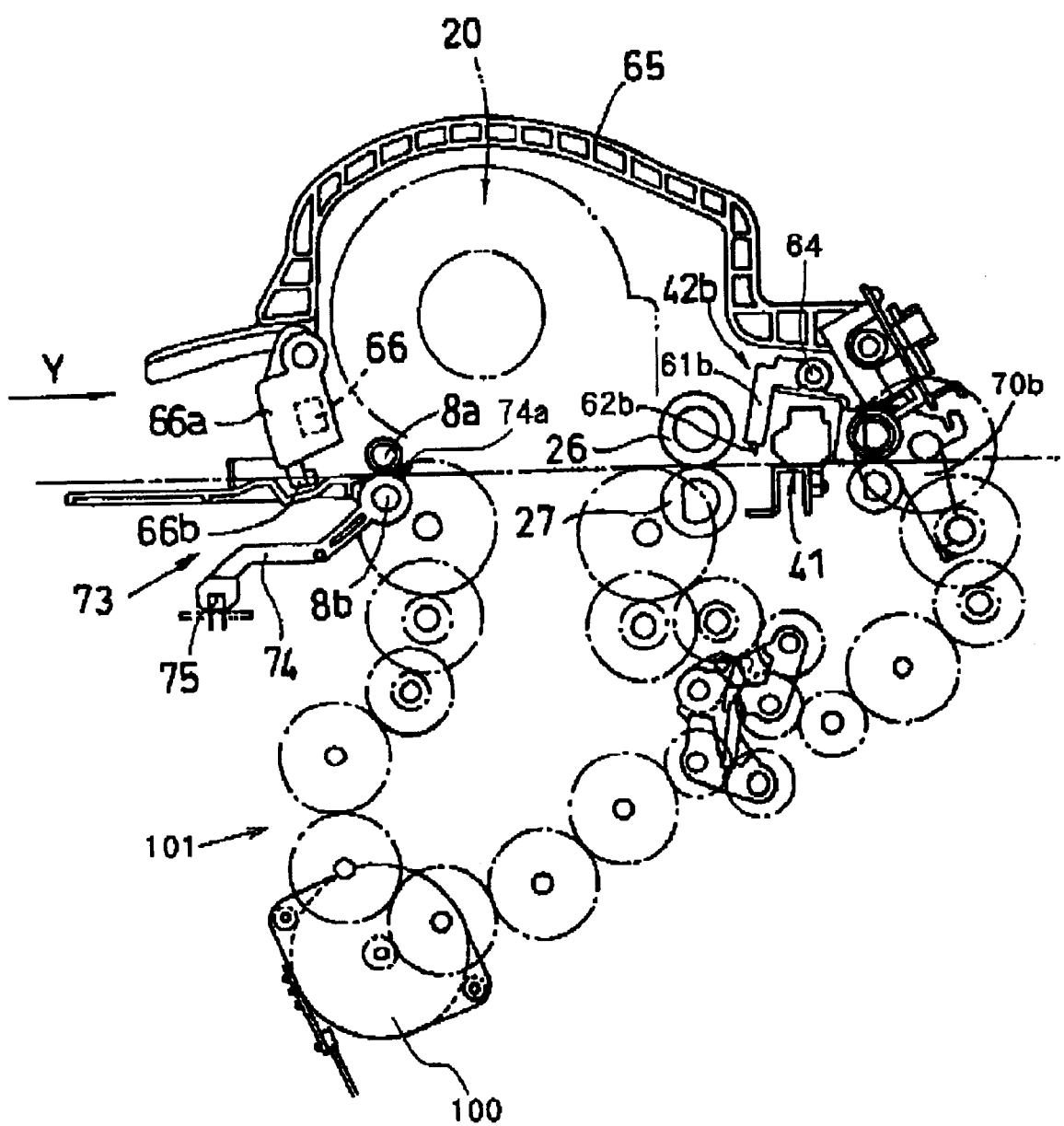
FIG. 3 is a cross-sectional view taken from the left side, that is, with respect to viewing the side of the laminating apparatus 1 that discharges the laminate R, and schematically showing distribution of components upstream and downstream from a web cassette with respect to the transport direction of the sheets P.

The pair of sheet supply rollers 8a, 8b are rotatably supported on chassis 10, which are positioned at the left and right hand sides of the laminating apparatus 1. As shown in FIG. 2, the sheet supply rollers 8a, 8b are disposed between the base end of the sheet supply tray 11 and the sheet entrance of a web cassette 20 (to to be described later) of the web supply portion WP. As shown in FIG. 3, a drive motor 100 is provided for supplying drive force, and a transmission gear mechanism 101 is provided for transmitting drive force from the drive motor 100 to one end of the shaft of the sheet supply roller 8b.

The web supply portion WP includes the web cassette 20, as mentioned previously. The web cassette 20 is freely detachably mounted in a cassette housing portion, which has an open upper surface. The web cassette 20 is positioned to laminate the sheet P, with the right side of the sheet P as a reference. In this case, "right" side of the sheet P refers to the sheet P as viewed from the sheet discharge slot of the case 1a. The web cassette 20 includes a housing 23 that houses two webs rolls, 21, 22, with the web roll 21 disposed above the web roll 22. The housing 23 is formed from a front and rear pair of cases, and is formed with a sheet insert port 24 and a sheet feed-out port 25. The sheet insert port 24 is formed extending laterally at the front end of the housing 23, and serves to feed in sheets P between the webs rolls 21, 22. The sheet feed-out port 25 is formed in the rear of the housing of the web rolls 21, 22, and functions to feed out a sheet fed in from the sheet insert port 24 and the webs S1, S2 fed out from the web rolls 21, 22, respectively, to a pair of pinch rollers 26, 27 of the laminating portion LP. Although not shown in the drawings, a pair of upper and lower shutters for opening and closing the sheet feed-out port 25 are provided at the sheet feed-out port 25.

The housing 23 is also formed with a pair of upper and lower guide plates 30a, 30b that extend from the sheet insert port 24 toward the sheet feed-out port 25. The guide plates 30a, 30b form a guide path for guiding the sheet P from the sheet insert port 24 toward the sheet feed-out port 25. According to the present embodiment, the guide plates 30a, 30*b* have different lengths. That is, the lower guide plate 30*b* is shorter than the upper guide plate 30*a*. Although not shown in the drawings, a resin spring plate is attached to the lower guide plate 30*b* for positioning the sheet P by pressing the sheet P up against the upper guide plate 30*a*.

The web rolls 21, 22 are wrapped with elongated webs S1, S2, respectively, around their exteriors in a roll condition. The webs S1, S2 have a particular construction. The upper web S1 has a base layer of transparent resin film coated with an adhesive layer on one surface of the resin film. In the present embodiment, the base film of the web S1 is a film of polyethylene terephthalate (PET).

The lower web S2 is a separation film, formed from paper in the present embodiment. That is to say, the web S2 has a base of paper laminated with a material, such as paraffin, for enhancing the separation effect of the web S2. Adhesive layer of the web S1 has adhesive strength sufficient for enabling the web S2 to be easily peeled away from the web S1 after they have been laminated together. The web S2 is thicker than the web S1 so the roll diameter of the lower web roll 22 is larger than the roll diameter of the upper web roll 21 when both webs S1, S2 are the same length. It should be noted that the web S2 can be configured from materials other than a separation sheet with a base layer of paper. For example, the web S2 can be made from a transparent web with a resin base having good separability.

The web rolls 21, 22 are rotatably supported within the housing 23 so that the webs S1, S2 are fed out from the sheet feed-out port 25 of the web cassette 20 with the adhesive surface of the web S1 facing the separation surface of the web S2.

The laminating portion LP includes a pair of upper and lower pinch rollers 26, 27 as mentioned above. The lower pinch rollers 27 is rotatably supported on the left and right chassis 10. The lower pinch roller 27 is a drive roller that is rotated by a motor or other drive source. On the other hand, the upper pinch roller 26 is a follower roller attached to rotate idly, and is driven to rotate by contact with the lower roller 27.

Here, operation of the laminating portion LP will be described. As described above, the web S1 has a transparent resin web layer as its base and this base is laminated on one side with adhesive layer, and the web S2 is a separable paper web. The upper pinch roller 26 presses the web S1 down against the upper surface of the sheet P so that the film layer of the web S1 adheres to the upper surface of the sheet P through the adhesive layer of the web S1. Also, lower pinch roller 27 presses the web S2 against the underside of the sheet P. However, because the web S2 is only a separation type sheet layer, the web S2 will not adhere to the sheet P. If the webs S1, S2 are wider than the sheet P, than the webs S1, S2 will protrude beyond the edge of the sheet P in the widthwise direction of the sheet P. In this case, the adhesive layer of the web S1 will adhere to the separation sheet layer of the web S2 at this protruding portion. Therefore, the webs S1, S2 and the sheet P will be formed into a substantially integral laminate R shown in FIG. 11. The laminate R is transported from the laminating portion P to the cutting portion CP.

The cutting portion CP includes a lateral cutting unit 41 and a longitudinal cutting unit 42. The lateral cutting unit 41 follow a guide rail 44 to move reciprocally in the X direction indicated in FIGS. 1, 5, and 11. The lateral cutting unit 41 functions to cut the laminate R following the X directions. The longitudinal cutting unit 42 cuts the left and right edges of the laminate R following the transport direction of the laminate R, that is, following Y directions shown in FIGS. 1, 7, and 11. The cutting portion CP includes a reference-side longitudinal cutting unit 42*a* and an other-side longitudinal cutting unit 42*b*.

According to the present embodiment, the right side of the sheet P, that is, the right side when viewing the discharge side of the laminating apparatus 1, is used as the reference for aligning sheets P, particularly when introducing the sheets P into the web cassette 20. Therefore, the reference-side longitudinal cutting unit 42*a* is disposed on the reference-side, that is, the right side, and also downstream in the sheet transport direction from the sheet feed-out port 25 of the web cassette 20. The other longitudinal cutting unit 42*b* is disposed on the left hand side as viewed in the discharge portion of the laminating apparatus 1.

Figure 7:
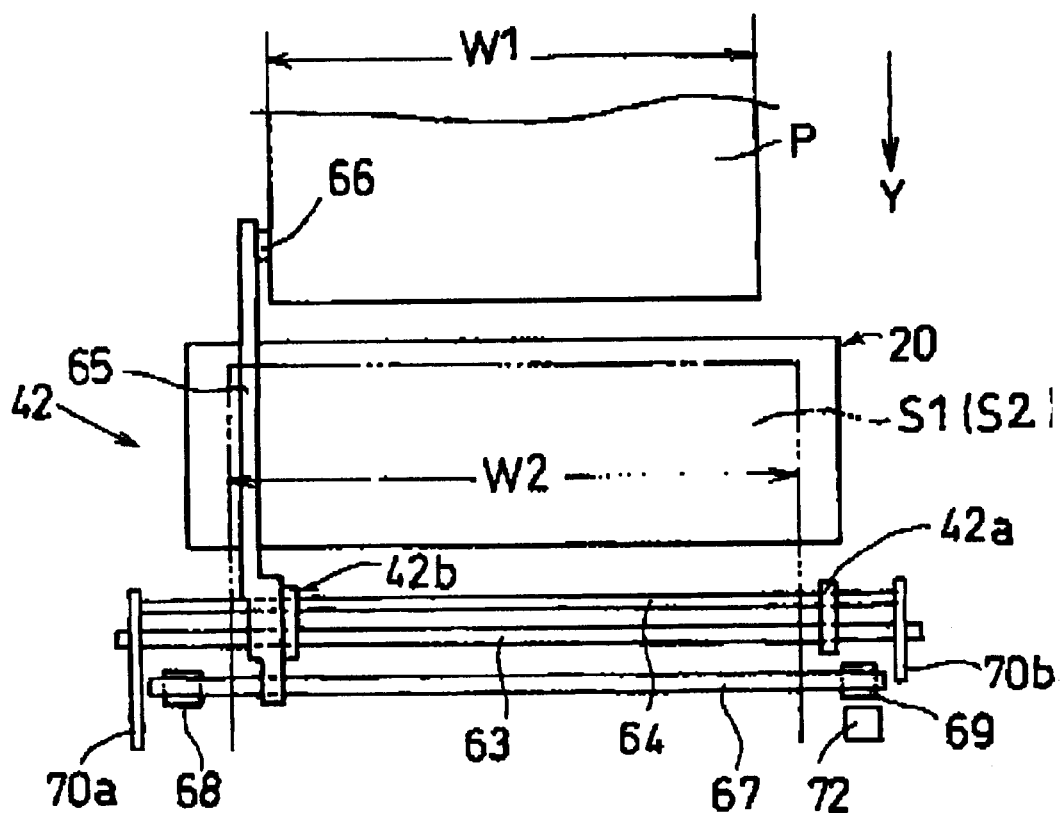
FIG. 7 is a plan view showing configuration of a longitudinal cutting unit.
Figure 11:
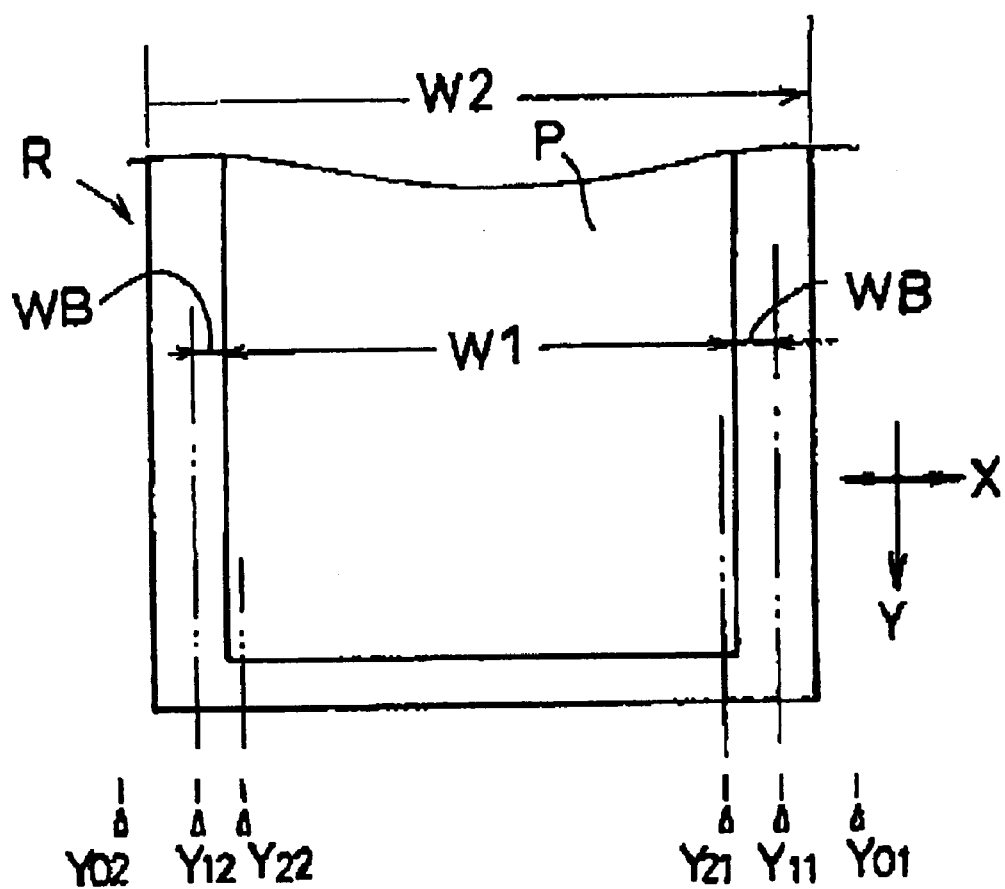
FIG. 11 is a schematic view showing positions of cutting units with respect to a laminate during each of the modes shown in FIGS. 9 (a) to 9 (d).

As shown in FIGS. 7 and 11, the webs S1, S2 are set with a width W2 greater than the width W1 of the sheet P. When the user indicates that the laminate R is to be discharged with the same width as the webs S1, S2, the reference-side longitudinal cutting unit 42*a* and the other-side longitudinal cutting unit 42*b* are positioned beyond the width W2 of the laminate R. Hereinafter, discharging the sheet as is, with the width of the webs S1, S2, will be referred to as not cut hereinafter.

The reference-side longitudinal cutting unit 42*a* and the other-side longitudinal cutting unit 42*b* are set at predetermined positions for a MARGIN mode or a NO MARGIN mode. In the MARGIN mode, the cutting units 42*a*, 42*b* cut the left and right edges of the webs S1, S2 by an amount that maintains a margin that equals the width W1 of the sheet P plus a width WB shown in FIG. 11. In the NO MARGIN mode, the cutting units 42*a*, 42*b* cut a slim width from widthwise left and right edges of the sheet P itself, so that the laminated condition of the webs S1, S2 does not stand out when the laminate R is viewed in plan.

Transport of the laminate R proceeds to a predetermined position in the Y directions, that is, in the transport direction of the sheet P, until the laminate R reaches the cutting position of the lateral cutting units 41, whereupon the lateral cutting unit 41 cuts the laminate R in the X directions and the discharge rollers 31 transport the laminate R out through the discharge port 32.

Figure 4:
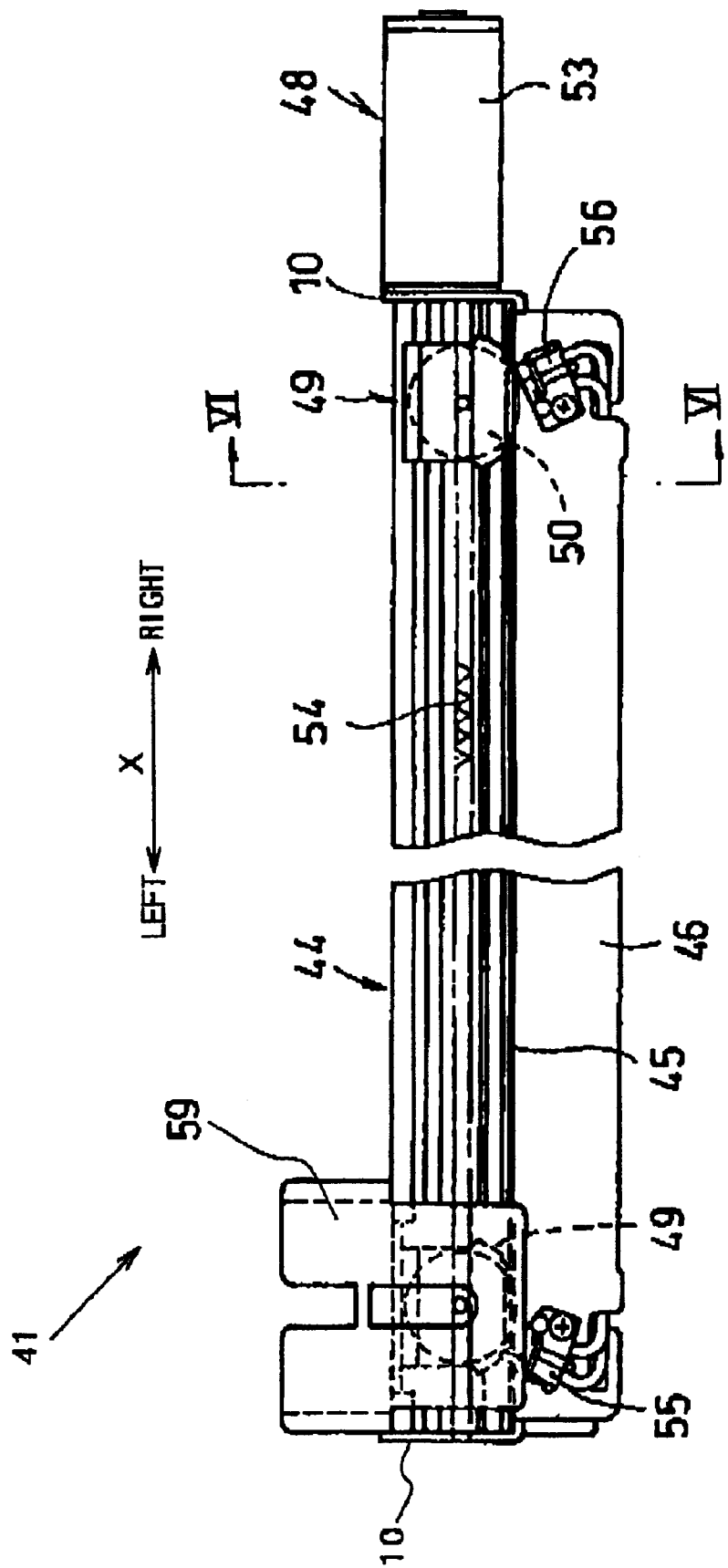
FIG. 4 is a front view showing overall configuration of a rotary lateral cutter unit of the laminating apparatus.
Figure 5:
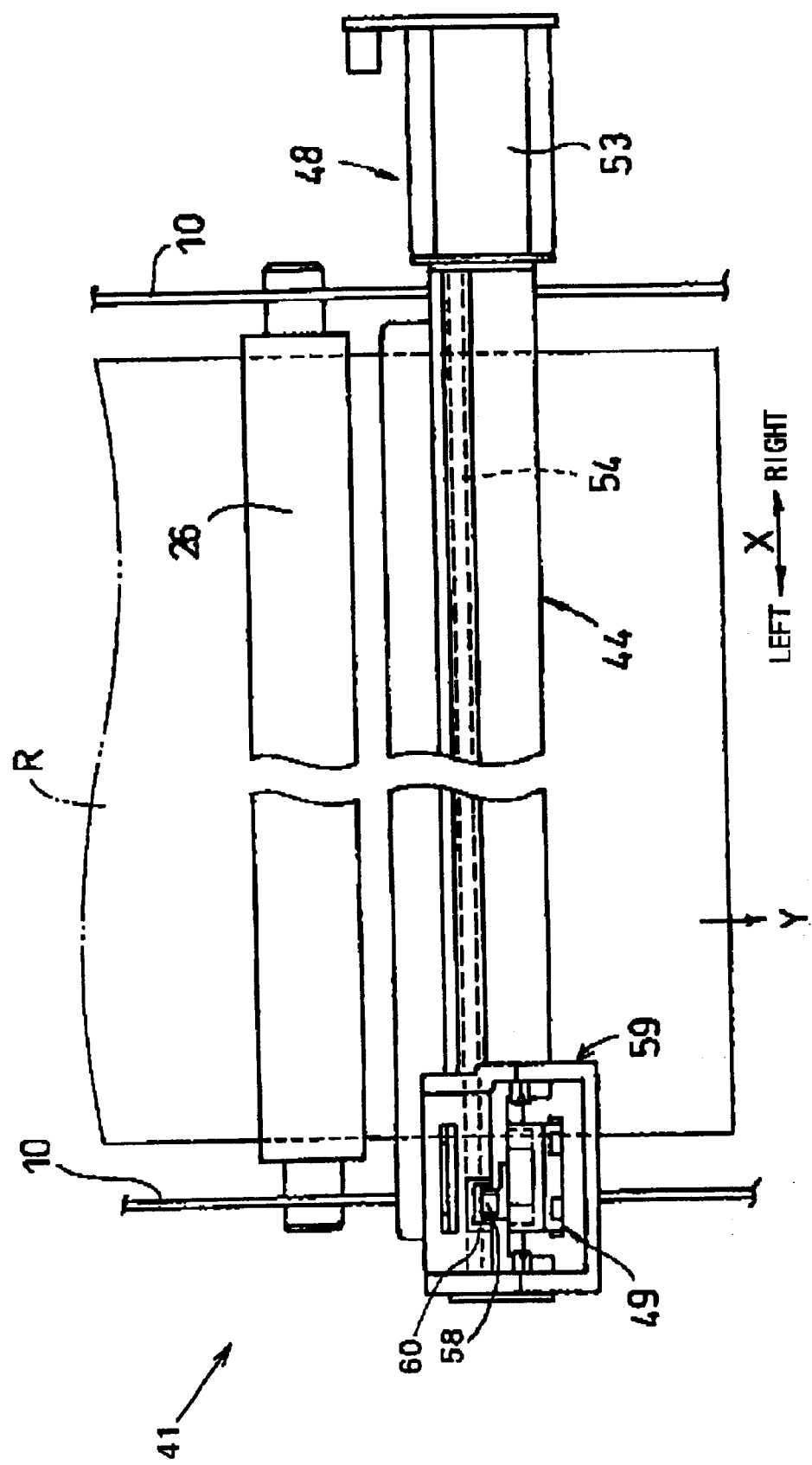
FIG. 5 is a partial plan view showing position of a cutter carriage of the lateral cutter unit on a detachable frame.

Next, the lateral cutting unit 41 will be described in more detail while referring to FIGS. 4 to 6. As shown in FIGS. 4 and 5, the lateral cutting unit 41 includes a guide rail 44, a fixed blade 45, a support chassis 46, a left and right pair of support chassis 10, 10, a cutter carriage 49, and a drive unit 48. The guide rail 44 is made from metal and is disposed in a horizontal posture between the support chassis 10, 10. The fixed blade 45 is made from metal plate disposed below the guide rail 44. The fixed blade 45 also serves as a guide plate. The support chassis 46 supports the fixed blade 45. The cutter carriage 49 is made from a synthetic resin material and mounted with a rotary blade 50. The cutter carriage 49 is fitted at the one end of the guide rail 44 in the guide groove of the guide rail 44, so as to be movable in the X directions following the guide groove. The drive unit 48 drives the cutter carriage 49 to move reciprocally in the X directions.

Figure 6:
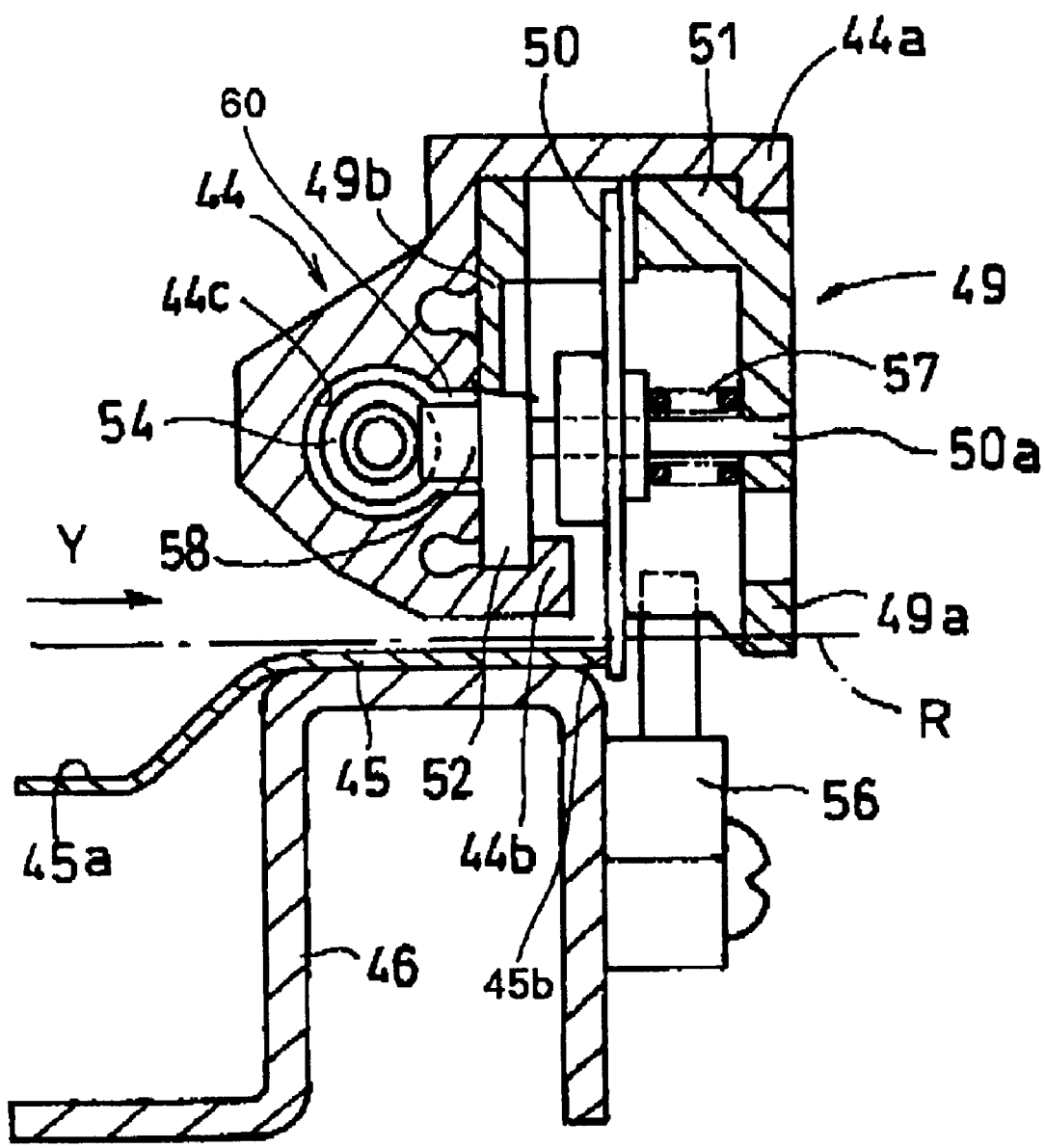
FIG. 6 is an enlarged cross-sectional view taken along a line VI—VI of FIG. 4.

As shown in FIG. 6, the fixed blade 45 is supported on the upper surface of the support chassis 46. The fixed blade 45 includes a sheet guide portion 45*a* and a blade portion 45*b* at opposite ends thereof with respect to the transport direction in which the laminate R is transported, which is one of the Y directions. The sheet guide portion 45*a* is formed by a downward bend in the fixed blade 45 at a position downstream from the upper surface of the support chassis 46. The blade portion 45b is formed by the edge of the fixed blade 45 that is downstream from the support chassis 46 in the transport direction, and that abuts against the side surface of the rotary blade 50. The guide rail 44 made from a metal material, such as aluminum pressed out member. The guide rail 44 includes integral upper and lower rail portions 44a, 44b and a guide slot portion 44c. The upper and lower rail portions 44a, 44b together form a substantial C shape in cross-section and are slidably fitted with upper and lower guide protrusion portion 51, 52, respectively of the cutter carriage 49. The guide slot portion 44c is formed between the upper and lower rail portions 44a, 44b, that is, substantially centered vertically between the upper and lower rail portions 44a, 44b. The guide slot portion 44c has an open edge. A spiral coil shaft 54 is fitted in the guide slot portion 44c. The spiral coil shaft 54 is connected to the cutter motor 53 and driven to produce a spiraling motion. The cutter motor 53 is a direct current motor capable of forward and reverse rotation and a part of the drive unit 48.

Limit sensors 55, 56 are disposed at left and right ends of the support chassis 46. The limit sensors 55, 56 are limit switches, for example, for detecting movement limits of the cutter carriage 49 in the widthwise direction of the sheet, that is, in left and right directions as viewed in FIG. 4. In the present embodiment, the home position is determined when the leftmost limit sensor 55 detects the cutter carriage 49. When the cutter carriage 49 is detected by the rightmost limit sensor 56, then the cutter motor 53 is driven to rotate reverse so that the cutter carriage 49 is moved back to the home position at the left end as viewed in FIGS. 4 and 5.

The cutter carriage 49 is made from front and rear side plates 49a, 49b, which are connected at upper ends by the upper end guide protrusion portion 51. The front and rear side plates 49a, 49b support both ends of a support shaft 50a on which the rotary blade 50 is supported. The lower edge and the left and right ends of the front and rear side plates 49a, 49b are open. At least the lower rounded edge of the rotary blade 50 is exposed out through this open lower edge of the side plates 49a, 49b. An urging coil spring 57 is located between the side surface of the rotary blade 50 and the inner surface of the front side plate 49a. With this configuration, the rotary blade 50 is slidingly pressed against the blade portion of the fixed blade 45 by the coil spring 57.

An engagement protrusion portion 58 protrudes horizontally outward from the rear side plate 49b from the surface of the rear side plate 49b into confrontation with the guide slot portion 44c of the guide rail 44, and into engagement with the spiral portion of the spiral coil shaft 54. As shown in FIGS. 4 and 5, a detachment guide frame 59 is formed at one side of the guide rail 44 in the lengthwise direction of the guide rail 44. According to the present embodiment, the detachment guide frame 59 is formed at the home position, which is the left end of the guide rail 44 as viewed in FIGS. 4 and 5. The detachment guide frame 59 is made from a synthetic resin material and is for detaching the cutter carriage 49 when exchanging the cutter carriage 49. A cutout indentation 60 is formed in the guide rail 44 from the upper rail portion 44a to the guide slot portion 44c so as to intersect in the lengthwise direction of the guide rail 44. The cutout indentation 60 enables the engagement protrusion portion 58 to pass therethrough by the guide slot portion 44c when detaching or engaging the spiral coil shaft 54 during exchange of the cutter carriage 49.

Next, configuration of the longitudinal cutting unit 42 will be described while referring to FIGS, 2, 3, and 7 through 10. As mentioned previously, the longitudinal cutting unit 42 includes the reference-side longitudinal cutting units 42a and the other-side longitudinal cutting unit 42b. According to the present embodiment, the right side, that is, as viewed from the discharge side of the laminating apparatus 1, is used as the reference for positioning the sheet P, such as with respect to the web cassette 20 when inserting the sheet P. Accordingly, the position of the reference-side longitudinal cutting unit 42a is on the right side (reference-side) as shown in FIG. 1, at a position downstream from the sheet feed-out port 25 of the web cassette 20 in the transport direction as shown in FIG. 2. The other-side longitudinal cutting unit 42b is disposed at a position on the left side as viewed from the discharge side of the laminating apparatus 1. The reference-side longitudinal cutting unit 42a is visible in right-side view of FIG. 8, and the other-wide longitudinal cutting unit 42b is visible in the left-side view of FIG. 3.

Each longitudinal cutting unit 42a (42b) includes a synthetic resin support body 61a ( (61b) and a knife shaped cutters 62a (61b). The knife shaped cutters 62a, 61b, are supported on the support bodies 61a, 61b, so as to protrude downward from the lower end of the corresponding support body 61a, 61b.

As shown in FIG. 7, shafts, 63, 64 of the longitudinal cutting unit 42 extend in the X directions. Both of the support bodies 61a, 61b are fitted on the shafts 63, 64 so as to be freely slidable in the X directions.

As shown in FIG. 7, an arm 65 including a base, a center portion, and a free end, is freely slidably engaged by its base on the guide shafts 63, 64. The support body 61b of the other-side longitudinal cutting unit 42b is fixed to the base-end side surface of the arm 65. As best seen in FIGS. 1 and 3, the center portion of the arm 65 is formed with a downward-facing concave shape that enables the upper portion of the web cassette 20 to pass through in the X directions. A detector casing 66a is mounted on the free end of the arm 65. The detector casing 66a housing a photo sensor 66, which serves as a sheet width sensor. A detection lever 66b protrudes downward from the detector casing 66a. The detection layer 66b is swingable with respect to the detector casing 66a. When the left edge of the sheet P abuts against the detection lever 66b, resultant swinging movement of the detection lever 66b is detected by the photo sensor 66 so that the width of the sheet P introduced by way of the sheet supply tray 11 can be measured.

As best seen in FIG. 7, a timing belt 67 which extends in the X directions is disposed above the transport pathway of the laminate R, which is downstream from the sheet feed-out port 25 of the web cassette 20. The timing belt 67 is wrapped around pulleys 68, 69, which are disposed to either side in the widthwise direction of the web cassette 20. A stepping motor 72 is provided for driving the pulley 69 to rotate in forward and reverse directions. The base of the arm 65 is connected to one position of the timing belt 69.

Figure 8:
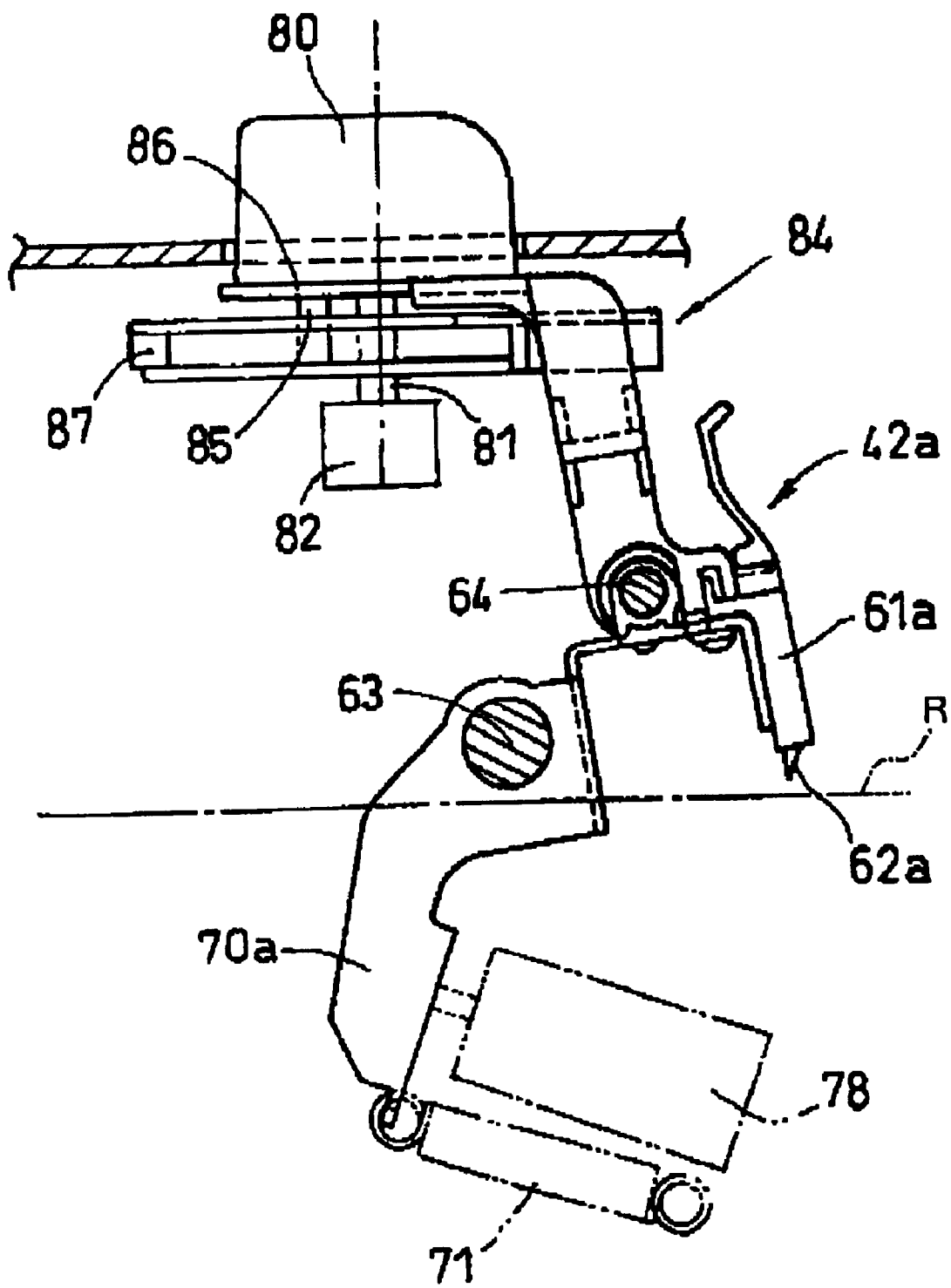
FIG. 8 is an enlarged cross-sectional view showing the reference side, that, is right side, of the longitudinal cutting unit and the power source switch, that is, a rotary knob.

Swing arms 70a, 70b are connected to the ends of the guide shafts 63, 64 for linking the guide shafts 63, 64 together so that the auxiliary guide shaft 64 is pivotable vertically around the guide shaft 63. As shown in FIG. 8, the right swing arm 70a is engaged with the shaft 63 at one end and connected to an urging spring 71 and an actuator 78 at the other. The urging spring 71 pulls to move the right swing arm 70a in a direction that separates the cutter 62a away from the upper surface of the laminate R. The actuator 78 is, for example, an electromagnetic solenoid. When the actuator 78 is operated, the swinging arm 70a pivots against the urging force of the urging spring 71 so that the cutter 62a lowers down onto and pierces that laminate R that is being transported. The cutter 62b lowers down onto and pierces the laminate R in linking association with movement of the cutter 62a.

A sensor 73 for detecting presence and absence of introduced sheet is provided near the sheet insert port 24 of the web cassette 20, for example, near the sheet feed rollers 8a, 8b. The sensor 73 detects the front end and rear end of the sheet P as the sheet P passes thereby, and measures the length of the sheet P to detect presence and absence of the sheet P. As shown in FIG. 3, the sensor 73 includes an arm 74 and an electrical sensor 75. The arm 74 is freely pivotably supported on the shaft of the lower sheet feed roller 8b. The arm 74 has a detection tip 74a at its upper end exposed in the sheet transport pathway. The lower end of the arm 74 is exposed in an electrical sensor 75, such as a proximity sensor or photo sensor. When the front edge of the sheet P presses the detection tip 74a of the arm 74 upward, so that the arm 74 pivots when the lower edge of the arm separates from the electrical sensor 75, it is determined that a sheet is present.

Figure 9:
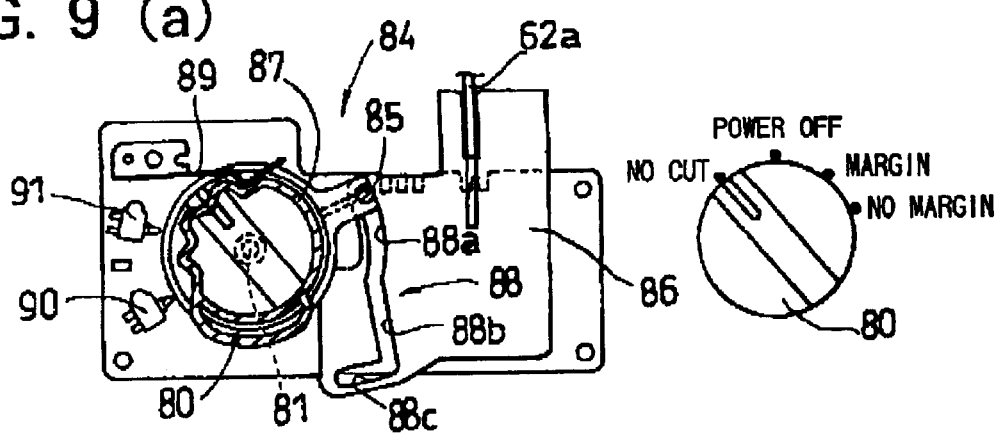
FIG. 9 (a) is a schematic view showing relationship between a NO CUT mode position of the rotary knob and positions of components in a link mechanism.
Figure 9:
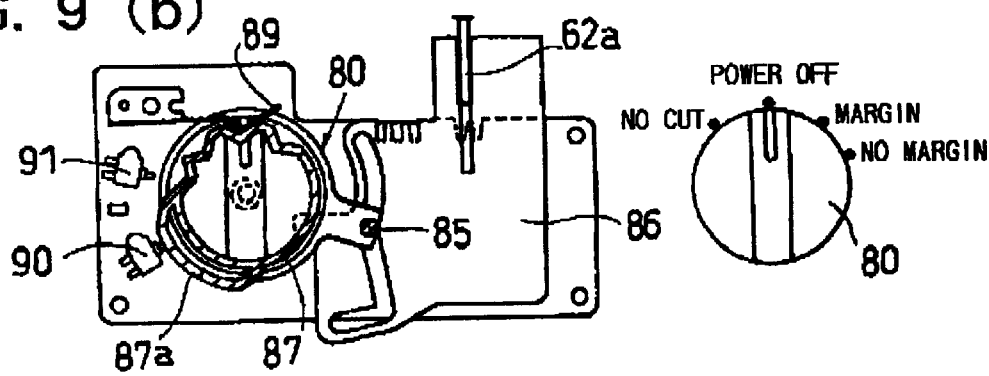
Figure 9:
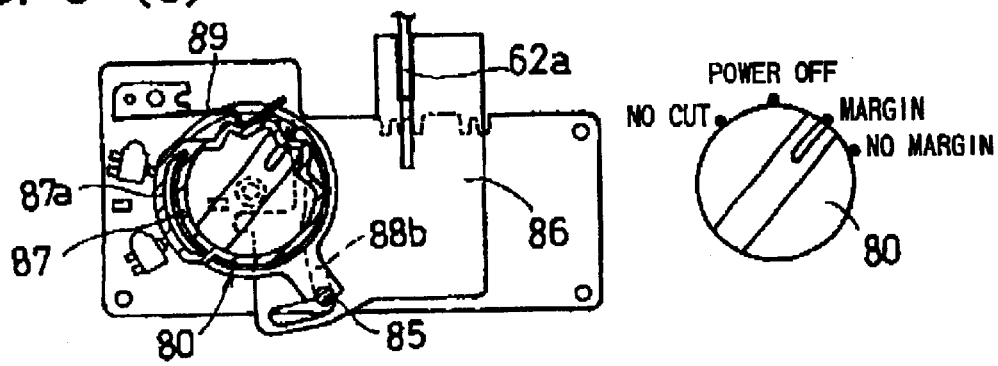
Figure 9:
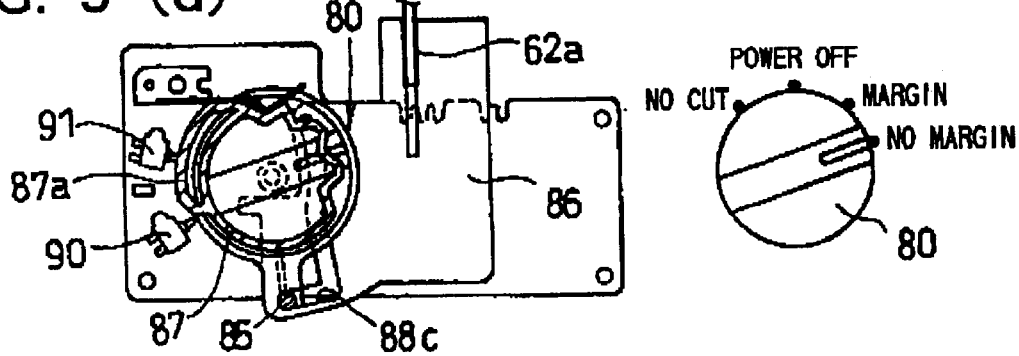

Next, an explanation will be provided for the control unit of the longitudinal cutting unit 42 while referring to FIGS. 8 to 9(d). A rotary knob 80 for turning ON and OFF the power source of the laminating apparatus 1 is disposed on upper surface of the case 1a. The rotary knob 80 is integrally formed with a vertically extending shaft 81 and is rotatable about the shaft 81. A rotary power switch 82 is connected to the lower end of the shaft 81 and disposed at a position inside the case 1a. The rotary power switch 82 is for turning ON and OFF the power circuit 83. As shown in FIGS. 9(a) to 9(d), the upper surface of the case 1a is printed with indicia of, from left to right NO CUT, POWER OFF, MARGIN, NO MARGIN, for indicating various modes that can be selected by rotating the rotary power switch 82 to the corresponding position.

A link mechanism 84 shown in FIGS. 8 and 9(a) links together the rotary knob 80 and the reference-side longitudinal cutting unit 42a so that the reference-side longitudinal cutting unit 42a moves in linking association with rotation of the rotary knob 80 into either a retracted position or a longitudinal cutting position depending on the modes selected by position of the rotary knob 80. The link mechanism 84 includes a rotation cam frame 87, an operation shaft 85, and a link plate 86. The rotation cam frame 87 is provided to rotate integrally with the rotary knob 80. The operation shaft 85 is disposed to the outer peripheral side of the rotation cam frame 87, and protrudes downward from the lower surface of the rotary knob 80. The link plate 86 is connected to the support body 61 of the reference-side longitudinal cutting unit 42a, and is formed with a guide slot 88. The operation shaft 85 is supported by a guide member (not shown) so as to be reciprocally movable in only the X directions, that is, the widthwise direction of the laminate R.

As shown in FIG. 9(a), the guide slot 88 formed in the link plate 86 includes an arch-shaped slot portion 88a, a linear slot portion 88b, and a bent linear slot portion 88c, which are all continuous with each other. When viewed in plan as in FIG. 9(a), the arch shape of the arch-shaped slot portion 88a and the movement path of the operation shaft 85 follow the same imaginary circle around the center shaft 81 of the rotary knob 80, when the rotary know 80 is positioned between the NO-CUT mode position and the POWER-OFF mode position. Therefore, when the rotary knob 80 is moved between the NO-CUT mode position and the POWER-OFF mode position, the operation shaft 85 moves within the slot portion 88a. Therefore, consequently, the link plate 86 will not be moved by rotation of the rotary knob 80 when the rotary knob 80 is pivoted between the NO-CUT mode position and the POWER-OFF mode position. The linear slot portion 88b extends in a direction so that distance between the linear slot portion 88b and the shaft 81 of the rotary knob 80 increases with distance along the linear slot portion 88b from the arch-shaped slot portion 88a. The operation shaft 85 is located in the linear slot portion 88b while the rotary knob 80 is between the POWER-OFF mode position and the MARGIN mode position. The bent linear slot portion 88c is bent at substantially a right angle, that is, as viewed in plan, with respect to the guide slot 88. The operation shaft 85 is located in the bent linear slot portion 88c when the rotary knob 80 is between the MARGIN mode position and the NO-MARGIN mode position.

Accordingly, as shown in FIGS. 9(a) and 9(b), when the rotary knob 80 is rotated between the NO-CUT and the POWER-OFF mode selection positions, the movement path of the operation shaft 85 is aligned with the arch-shaped of the arch-shaped slot portion 88a on the same imaginary circle that is centered on the shaft 81 of the rotary knob 80. Therefore, while the knob is moved from the NO-CUT to the POWER-OFF mode selection positions, the operation shaft 85 moves only within the arch-shaped slot portion 88a so that the link plate 86 will not move even though the the rotary knob 80 is moved. Accordingly, the cutter 62a, which is connected to the link plate 86, will remain at a position Y01 shown in FIG. 11, that is, will remain at the retracted position to the exterior of the right edge of the laminate R.

As shown in FIG. 9(i c), when the rotary knob 80 is rotated to the MARGIN mode selection position, the operation shaft 85 pivots around the shaft 81 within the linear shaped slot portion 88b, and presses against the inner surface of the linear shaped slot portion 88b. As a result of this pressing movement by the pivoting operation shaft 85, the link plate 86 moves leftward from the position shown in FIG. 9(b) to the position shown in FIG. 9(c), and the cutter 62a moves accordingly into position Y11 shown in FIG. 11. The position Y11 is the right most position and is separated from right edge of the sheet by a distance WB. In this condition, the webs S1, S2 will be cut be with a right margin having a predetermined width WB.

As shown in FIG 9(d), when the rotary knob 80 is further rotated into the NO-MARGIN mode selection position, the operation shaft 85 moves within the bent linear slot portion 88c so as to press against the inner peripheral surface of the bent linear slot portion 88c. In accordance with pivoting movement of the operation shaft 85, the link plate 86 moves slightly to the left from the position shown in FIG. 9(c) to the position shown in FIG. 9(d). As a result, the cutter 62a moves to a position Y21 shown in FIG. 11. The position Y21 is slightly to the left of the right edge of the sheet P. As a result, the webs S1, S2 will be cut with no right margin.

As shown in FIGS. 9(a) to 9(d), the outer surface of the rotation cam frame 87 is formed with protrusions and indentations. The rotation cam frame 87 rotates integrally with rotation of the rotary knob. A click spring 89 engages in a groove of the rotation cam frame 87 that corresponds to the mode selection position of the rotary knob 80. That is, each time the click spring 89 falls into one of the grooves with rotation of the knob 80, the user will sense a click that indicates that the rotary knob 80 is temporarily stopped in place.

The rotation cam frame 87 is provided with a maximum diameter section 87a. First and second switches 90, 91 are disposed adjacent to the rotation came frame 87 so as to selectively abut against the maximum diameter section 87a with pivoting movement of the rotary knob 80. A controller 92 to be described later controls rotation of the stepping motor 72 to move the other-side longitudinal cutting unit 42b leftward and rightward via the timing belt 67, so that the position of the other-side longitudinal cutting unit 42b can be set to a predetermined position based on the output from the first and second selection switches 90, 91.

That is to say, when the rotary knob 80 is located at either the NO-CUT or POWER OFF mode selection position, the controller 92 controls the other-side longitudinal cutting unit 42b to move the cutter 62b into the Y02 position shown in FIG. 11, that is, to the retracted position to the outside of the left edge of the laminate R. When the rotary knob 80 is rotated to the MARGIN mode selection position, the cuter 62b will be moved to position Y12, that is, the position separated by a distance WB from the left edge of the sheet P. In this condition, the webs S1, S2 can be cut with a left margin having the predetermined width WB. When the rotary knob 80 is rotated further to the NO-MARGIN mode selection position as shown in FIG. 9(i d), the cutter 62b will be moved to the position Y22 shown in FIG. 11, that is, at a position slightly to the right of the left edge of the sheet P. As a result, the webs S1, S2 can be cut with no left margin.

The controller 92 can be an electric microcomputer including a central processing unit (CPU), a ROM storing predetermined control programs, and a RAM storing a variety of different data types. The controller 92 uses the signal from the sheet width sensor 66 to detect the width of the sheet P introduced into the web cassette 20, and then automatically controls the position of the other-side longitudinal cutting unit 42b based on the detected width. The controller 92 also changes the cutting condition of the left and right side longitudinal cutting units 42a, 42b, controls operation of the lateral cutting unit 41, and executes other programs.

Figure 10:
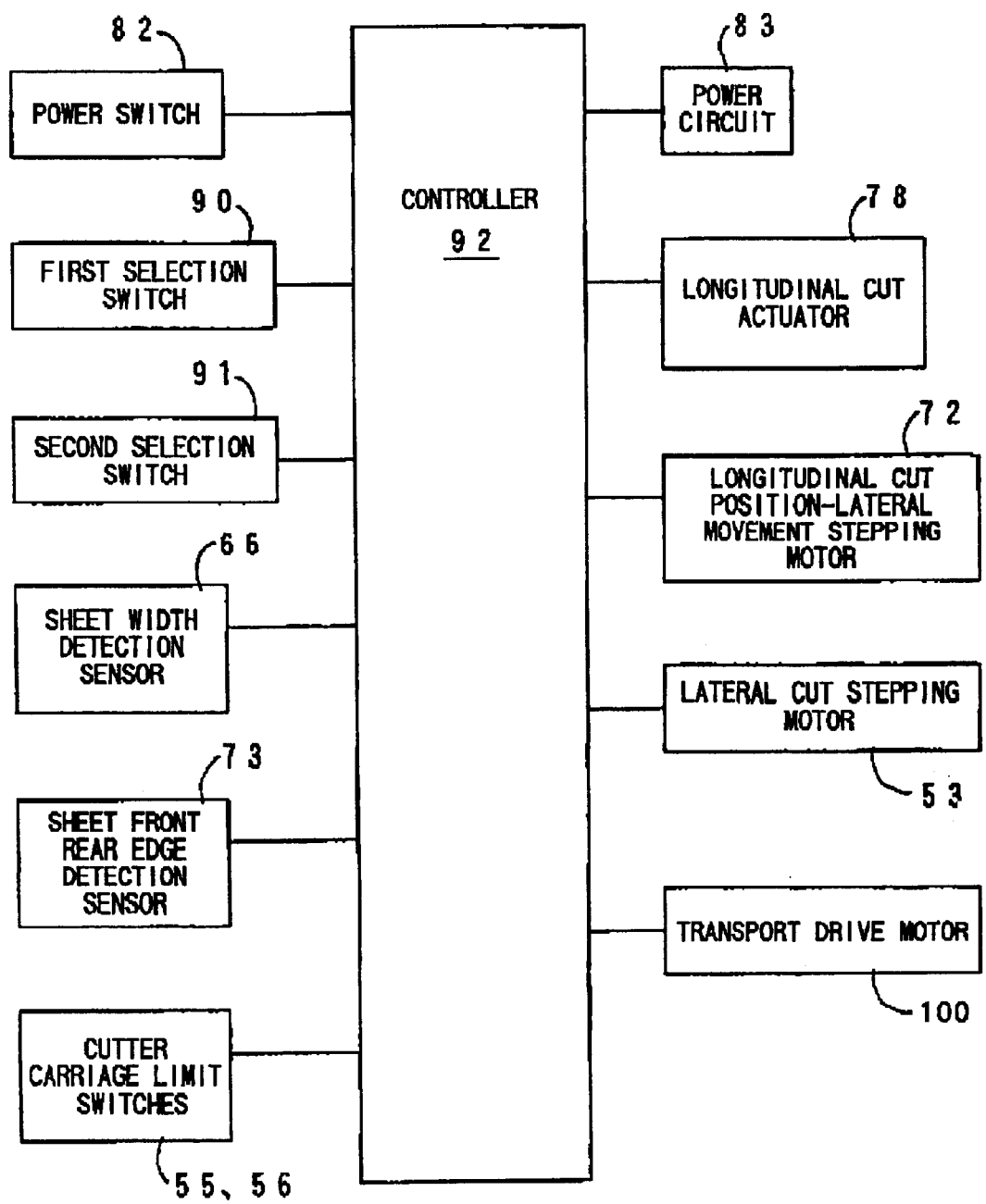
FIG. 10 is a block diagram showing connection of electrical components of the laminating device.

As shown in FIG. 10, the controller 92 is connected to the rotary power switch 82, the first selection switch 90, the second selection switch 91, the photo sensor 66, the paper introduction sensor 73, and the limit switches 55, 56, and receives input signals from all of these elements. Also, the controller 92 is connected to, and drives at a predetermined timing, the power circuit 83, the actuator 78 for operating for driving the longitudinal cutting, the stepping motor 72 for driving longitudinal cutting in the widthwise direction of the sheet P, and the cutter motor 53 for driving lateral cutting operations.

Next, an operation performed by the laminating apparatus 1 for preparing the laminate R will be explained. While the rotary knob 80 is located at the POWER-OFF mode selection position, the cutter 62a of the reference-side longitudinal cutting unit 42a is located at the retracted position Y01 to the right of the edge of the laminate R as a result of mechanical linking relationship between the rotary knob 80, the operations haft 85, and the link plate 86 described above. Also, because only the first detection switch 90 is in its ON condition, the cutter 62b of the other-side longitudinal cutting unit 42b will also be in its retracted position Y02 to the left edge of the laminate R, and also the rotary power switch 82 will be in be turned OFF so that the power supply is stopped. It should be noted that when the rotary knob 80 is in any mode selection position other than the POWER-OFF mode selection position, the rotary power switch 82 will be turned ON so that power is supplied to the laminating apparatus 1 through the power circuit 83.

When the rotary knob 80 is in the NO-CUT mode selection position, the first and second selection switches 90, 91 will output OFF signals, which indicates that the laminate R should be discharged with the width same as the width of the supplied webs S1, S2. Therefore, the left and right longitudinal cutting units 42a, 42b are maintained in the same retracted positions as for the POWER-OFF mode selection position.

When the rotary knob 80 is rotated into the MARGIN mode selection position, the link plate 86 will move in association with rotation of the rotary knob 80 so that the cutter 62a of the reference-side longitudinal cutting unit 42a is set in the position Y11 of FIG. 11. Also, both of the first and second selection switches 90, 91 output ON signals so that the stepping motor 72 is operated to move the arm 65 in one of the X directions until the photo sensor 66 detects the left edge of the introduced sheet P. Once the left edge is detected, the control program for providing margin controls to move the arm 65 in the direction for separating the arm 65 from the left edge of the sheet P. Movement of the arm 65 is stopped once the arm 65 has moved a duration of time required to separate the arm 65 from the left edge of the sheet P by the distance WB. At this time, the cutter 62b of the other-side longitudinal cutting unit 42b, which moves in the X directions in association with the arm 65, is set at the position Y12 of FIG. 11. Next, the sheet P is fed into the web cassette 20, and discharged a predetermined distance. Once the front edge of the laminate R is fed to pass by both the cutting units 42a, 42b, the actuator 78 is operated so that the left and right cutters 62a, 62b are lowered down onto the laminate R so as to pierce through the laminate R. As a result, as the laminate R passes through the laminating apparatus 1, it is cut in the longitudinal direction to retain margins with a width WB at both left and right edges of the sheet P.

If the rotary knob 80 is rotated to the NO-MARGIN mode selected position, the link plate 86 will move in association with rotational knob 80 to a larger extend than when moved to the MARGIN mode selection position, until the cutter 62a of the reference-side longitudinal cutting unit 42a is set to the position Y21 shown in FIG. 11. Also, only the second selection switch 91 will output an ON signal. Therefore, the stepping motor 72 moves the arm 65 in one of the X directions until the photo sensor 66 detects the left edge of the sheet P. Then the control program for not providing any margins controls the stepping motor 72 to further move the arm 65 slightly to the right from the left edge of the sheet P, so that the cutter 62b of the other-side longitudinal cutting unit 42b is set at the position Y22 of FIG. 11, where the arm 65 is located slightly to the right of the left edge of the sheet P. Afterward, in the same manner as in the MARGIN mode, the left and right cutters 62a, 62b are driven to drop down and pierce the laminates R. As a result, the laminate R is cut longitudinally with no margin to the left and right sides of the sheet P.

Next, when the sheet feed rollers 8a, 8b and the pinch rollers 26, 27 are operated for a predetermined duration of time after the front edge of the introduced sheet P is detected, the rear edge of the sheet P will have passed by the location of the lateral cutting unit 41. Therefore, by operating the cutter motor after a short time has passed after that, the drive unit 48 moves reciprocally so as to cut the laminate R following the X directions while the side surface of the rotary knob 80 abuts against the fixed blade 45 to horizontally cut while maintaining a margin at the front and rear of the laminate R in the transport direction.

While the invention has been described in detail with reference to specific embodiments thereof, it would be apparent to those skilled in the art that various changes and modifications may be made therein without departing from the spirit of the invention, the scope of which is defined by the attached claims.

For example, the present invention can be applied to a laminating apparatus wherein the web is input directly into the laminating apparatus, that is, where no web cassette is used.

What is claimed is:

1. A laminating apparatus comprising:
   a power switch that turns on and off a power source that supplies power;
   a sheet transport unit that transports, in a transport direction, a sheet to be laminated;
   a laminating unit that feeds out laminating webs have a predetermined width in a widthwise direction perpendicular to the transport directions, and that adheringly laminates the laminating webs onto upper and lower surfaces of the sheet transported by the sheet transport unit, thereby producing a laminate having the predetermined width;
   a cutter unit that cuts a widthwise edge from the laminate following the transport direction, the cutter unit being disposed downstream from the laminating unit in the transport direction; and
   a cutter transport unit that selectively positions the cutter unit at a cut position for cutting the laminate, and, when the power switch turns off the power source, moves the cutter unit in the widthwise direction to a retracted position outside the predetermined width of the laminate.

2. A laminating apparatus as claimed in claim 1, wherein:
   the cutter unit includes a reference side cutter and an other side cutter disposed at a reference side and an other side, respectively, in the widthwise direction for cutting away widthwise opposite edges of the laminate;
   the power switch includes a rotary knob rotatable between different mode positions for selecting different modes including a power off mode to turn off the power source; and
   the cutter transport unit includes a linking mechanism for linkingly transmitting rotation movement of the rotary knob to the reference side cutter to move the reference side cutter between the cut position and the retracted position in accordance with the mode position of the rotary knob.

3. A laminating apparatus as claimed in claim 2, wherein the cutter transport unit further includes a drive motor that selectively moves the other side cutter between the retracted position and the cut position in accordance with the mode position of the rotary knob.

4. A laminating apparatus as claimed in claim 2, wherein when the rotary knob is in a power off position for selecting the power off mode, the cutter transport unit moves the reference side cutter and the other side cutter into the retracted position.

5. A laminating apparatus as claimed in claim 4, wherein the cutter transport unit further includes a drive motor that selectively moves the other side cutter between the retracted position and the cut position in accordance with the mode position of the rotary knob.

6. A laminating apparatus as claimed in claim 1, further comprising a sheet width detector that detects a width of the sheet transported by the sheet transport unit, the cutter transport unit positioning, while the power source is in an on condition by the power switch, the cutter unit based on the width detected by the sheet width detector.

* * * * *